United States Patent
Lee et al.

(10) Patent No.: US 12,092,794 B2
(45) Date of Patent: Sep. 17, 2024

(54) ANTI-GLARE FILM, POLARIZING PLATE AND DISPLAY APPARATUS

(71) Applicant: LG CHEM, LTD., Seoul (KR)

(72) Inventors: Hanna Lee, Daejeon (KR); Jung Hyun Seo, Daejeon (KR); Hye Min Lee, Daejeon (KR); Yeongrae Chang, Daejeon (KR); Joo Jong Moon, Daejeon (KR); Jae Hak Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 561 days.

(21) Appl. No.: 17/601,634

(22) PCT Filed: Nov. 24, 2020

(86) PCT No.: PCT/KR2020/016715
§ 371 (c)(1),
(2) Date: Oct. 5, 2021

(87) PCT Pub. No.: WO2021/107572
PCT Pub. Date: Jun. 3, 2021

(65) Prior Publication Data
US 2022/0206188 A1 Jun. 30, 2022

(30) Foreign Application Priority Data

Nov. 23, 2019 (KR) .................. 10-2019-0157960
Nov. 26, 2019 (KR) .................. 10-2019-0153705

(51) Int. Cl.
| | | |
|---|---|---|
| G02B 1/111 | (2015.01) | |
| G02B 1/14 | (2015.01) | |
| G02B 5/30 | (2006.01) | |
| G02F 1/1335 | (2006.01) | |

(52) U.S. Cl.
CPC .............. *G02B 1/111* (2013.01); *G02B 1/14* (2015.01); *G02B 5/3025* (2013.01); *G02F 1/133502* (2013.01)

(58) Field of Classification Search
CPC ........ C08K 2201/003; C08K 2201/005; C09D 7/40; C09D 7/60; C09D 7/61; C09D 7/62; C09D 7/63; C09D 7/66; C09D 7/67; C09D 7/68; C09D 7/69; G02B 1/11; G02B 1/111; G02B 1/14
See application file for complete search history.

(56) References Cited

U.S. PATENT DOCUMENTS

| | | |
|---|---|---|
| 9,738,809 B2 | 8/2017 | Shim et al. |
| 10,048,407 B2 | 8/2018 | Eguchi et al. |
| 2002/0158853 A1 | 10/2002 | Sugawara et al. |
| 2008/0138606 A1 | 6/2008 | Yoshihara et al. |
| 2010/0027124 A1 | 2/2010 | Nagahama et al. |
| 2010/0112296 A1 | 5/2010 | Yoshihara et al. |
| 2014/0211316 A1 | 7/2014 | Furui et al. |
| 2018/0313978 A1 | 11/2018 | Chang et al. |
| 2020/0148911 A1 | 5/2020 | Byun et al. |
| 2020/0233119 A1 | 7/2020 | Sugawara et al. |

FOREIGN PATENT DOCUMENTS

| | | |
|---|---|---|
| CN | 103975258 A | 8/2014 |
| CN | 107003562 A | 8/2017 |
| CN | 107850692 A | 3/2018 |
| EP | 2144094 A1 | 1/2010 |
| EP | 3299851 A1 | 3/2018 |
| JP | 2010-128108 A | 6/2010 |
| JP | 2010-237584 A | 10/2010 |
| JP | 2014-059334 A | 4/2014 |
| JP | 2014-112257 A | 6/2014 |
| JP | 2015-206837 A | 11/2015 |
| JP | 2019-105692 A | 6/2019 |
| KR | 10-2006-0134100 A | 12/2006 |
| KR | 10-2010-0019407 A | 2/2010 |
| KR | 10-2011-0095820 A | 8/2011 |
| KR | 10-2014-0036771 A | 3/2014 |
| KR | 10-2014-0072859 A | 6/2014 |
| KR | 10-2015-0120264 A | 10/2015 |
| KR | 10-2017-0031640 A | 3/2017 |
| KR | 10-2017-0100555 A | 9/2017 |
| KR | 10-2017-0103983 A | 9/2017 |
| KR | 10-2019-0031038 A | 3/2019 |
| TW | 200905252 A | 2/2009 |

OTHER PUBLICATIONS

Machine translation of KR 2015-0120264 (Year: 2015).*
International Search Report dated Mar. 4, 2021, issued in the corresponding International Application No. PCT/KR2020/016715, 4 pages.

* cited by examiner

*Primary Examiner* — Zachary M Davis

(74) *Attorney, Agent, or Firm* — ROTHWELL, FIGG, ERNST & MANBECK, P.C.

(57) ABSTRACT

The present disclosure relates to an anti-glare film including a light-transmitting substrate; and a hard coating layer containing a binder resin and particles dispersed in the binder resin, a polarizing plate, and a display apparatus including the same, wherein the particles include a first inorganic particle aggregate having an average particle diameter of 1 to 2 μm; a second inorganic particle aggregate having an average particle diameter of 3 to 5 μm; and organic particles in the form of primary particles having an average particle diameter of 1 to 10 μm.

20 Claims, No Drawings

ANTI-GLARE FILM, POLARIZING PLATE AND DISPLAY APPARATUS

CROSS-REFERENCE TO RELATED APPLICATION(S)

This application is a 35 U.S.C. 371 National Phase Entry Application from PCT/KR2020/016715, filed on Nov. 24, 2020 and designating the United States, which claims the benefit of Korean Patent Application Nos. 10-2019-0153705 filed on Nov. 26, 2019; and 10-2020-0157960 filed on Nov. 23, 2020, with the Korean Intellectual Property Office, all of the disclosures of which are herein incorporated by reference in their entirety.

FIELD OF THE INVENTION

The present disclosure relates to an anti-glare film, a polarizing plate, and a display apparatus including the same.

BACKGROUND OF THE INVENTION

As flat panel display technology develops toward large-area and high-resolution displays, applied products are changing from home and office applications such as TVs, monitors, and mobiles to large displays such as outdoor billboards and electronic signs. If flat panel displays such as LCDs, PDPs, OLEDs, rear-projection TVs are exposed to external light such as sunlight, a user feels fatigue in his/her eyes or a headache due to light reflecting from surfaces, and images made in displays are not clearly considered.

In order to solve the disadvantages, an anti-glare film is applied to scatter external light from the surface by forming irregularities on the surface of the display or to induce internal scattering by using the refractive index between the resin and particles which form the coating film. A conventional anti-glare film applied to a surface of a display apparatus or the like for this purpose has a problem in that an image of external light (e.g., a lamp) is formed on the film or light spreading occurs by external light. For this reason, there is a demand for an anti-glare film that not only has an anti-glare effect, but also prevents image formation on the display apparatus or light spreading by external light.

BRIEF SUMMARY OF THE INVENTION

According to the present disclosure, there is provided an excellent anti-glare film capable of preventing sparkling defects, occurrence of rainbow, image formation of a lamp and light spreading while having excellent anti-glare properties as well as excellent physical properties such as scratch resistance and stain resistance.

In addition, there are provided a polarizing plate and a display apparatus capable of preventing sparkling defects, occurrence of rainbow, image formation of a lamp and light spreading while having excellent anti-glare properties as well as excellent physical properties such as scratch resistance and stain resistance.

In the present disclosure, there is provided an anti-glare film including a light-transmitting substrate; and a hard coating layer containing a binder resin and particles dispersed in the binder resin, wherein the particles include a first inorganic particle aggregate having an average particle diameter of 1 to 2 µm; a second inorganic particle aggregate having an average particle diameter of 3 to 5 µm; and organic particles in the form of primary particles having an average particle diameter of 1 to 10 µm.

In addition, there is provided a polarizing plate including the above anti-glare film.

In the present disclosure, there is also provided a display apparatus including the above anti-glare film.

Page 3

DETAILED DESCRIPTION OF THE INVENTION

Hereinafter, the anti-glare film, the polarizing plate and the display apparatus including the same according to specific embodiments of the present disclosure will be described in more detail In the present disclosure, the terms "the first", "the second", and the like are used to describe a variety of components, and these terms are merely employed to distinguish a certain component from other components.

In addition, the (meth)acrylate includes both acrylate and methacrylate.

In addition, the photocurable resin collectively refers to a polymer resin polymerized by light irradiation, for example, by visible light irradiation or ultraviolet light irradiation.

In addition, the (co)polymer includes both a co-polymer and a homo-polymer.

In addition, the inorganic particle aggregate refers to secondary or tertiary particles in which two or more inorganic particles in the form of primary particles are aggregated.

According to the present disclosure, there may be provided an anti-glare film including a light-transmitting substrate; and a hard coating layer containing a binder resin and particles dispersed in the binder resin, wherein the particles include a first inorganic particle aggregate having an average particle diameter of 1 to 2 µm; a second inorganic particle aggregate having an average particle diameter of 3 to 5 µm; and organic particles in the form of primary particles having an average particle diameter of 1 to 10 µm.

The present inventors have confirmed that an anti-glare film including a light-transmitting substrate and a hard coating layer prevents sparkling defects, occurrence of rainbow, image formation of a lamp and light spreading while having excellent anti-glare properties, thereby exhibiting remarkably excellent visibility, when the hard coating layer contains a first inorganic particle aggregate having an average particle diameter of 1 to 2 µm, a second inorganic particle aggregate having an average particle diameter of 3 to 5 µm, and organic particles in the form of primary particles having an average particle diameter of 1 to 10 µm. And they have completed the present invention.

Specifically, the anti-glare film should have excellent visibility even when external light is scattered in addition to anti-glare properties. When the anti-glare film according to the embodiment is illuminated by external light, e.g., by a lamp, the lamp image is not formed, so that the lamp image is not clearly recognized. Further, little light spreading occurs, so that the afterimage of the lamp is not easily recognized by the eyes.

The hard coating layer included in the anti-glare film contains a binder resin and particles dispersed in the binder resin. In addition, the particles contained in the hard coating layer may be three or more types of particles, and specifically, a first inorganic particle aggregate having an average particle diameter of 1 to 2 µm, a second inorganic particle aggregate having an average particle diameter of 3 to 5 µm, and organic particles in the form of primary particles having an average particle diameter of 1 to 10 µm.

In particular, the hard coating layer may contain two types of inorganic particle aggregates having different average particle diameters, specifically, a first inorganic particle aggregate having an average particle diameter of 1 to 2 μm, and a second inorganic particle aggregate having an average particle diameter of 3 to 5 μm. Due to the first and second inorganic particle aggregates, fine irregularities may be formed on a surface of the hard coating layer. Specifically, the fine irregularities may be formed on a surface facing an interface between the hard coating layer and the light-transmitting substrate, that is, a surface of the hard coating layer that is not in contact with the light-transmitting substrate.

Conventionally, individual organic or inorganic particles in the form of primary particles outthrust the surface of the hard coating layer to form irregularities. However, the first and second inorganic particle aggregates included in the hard coating layer are in the form of secondary particles formed by aggregating a plurality of first and second inorganic particles in the form of primary particles, respectively. In particular, the first and second inorganic particles are aggregated in a horizontal or vertical direction with respect to the hard coating layer in the plane to form the first and second inorganic particle aggregates, respectively. Accordingly, the first and second inorganic particle aggregates become a convex part on the surface of the hard coating layer, thereby forming fine irregularities on the surface of the hard coating layer. Since the above-described fine irregularities are formed on the surface of the hard coating layer, it is possible to prevent sparkling defects, image formation of a lamp and light spreading, while exhibiting excellent anti-glare properties.

In addition, the anti-glare film includes the hard coating layer containing two types of inorganic particle aggregates having different average particle diameters, specifically, a first inorganic particle aggregate having an average particle diameter of 1 to 2 μm, and a second inorganic particle aggregate having an average particle diameter of 3 to 5 μm, thereby achieving excellent anti-glare visibility. When the hard coating layer contains only the first inorganic particle aggregates having a relatively small average particle diameter, a lamp image may be formed to cause glare. When the hard coating layer contains only the second inorganic particle aggregates having a relatively large average particle diameter, the lamp image is not formed, but the degree of light spreading is large, so that the lamp may be dimly visible, and visibility of the screen may be poor.

The first inorganic particle aggregate may have an average particle diameter of 1 to 2 μm, 1.1 to 1.9 μm, or 1.2 to 1.8 μm. In addition, the second inorganic particle aggregate may have an average particle diameter of 3 to 5 μm, 3.1 to 4.8, or 3.2 to 4.5 μm.

An average particle diameter ratio of the second inorganic particle aggregate to the first inorganic particle aggregate may be 1.5 to 4 times, 2 to 3.5 times, or 2 to 3 times. When the ratio is less than 1.5 times, the size of surface irregularities decreases and the lamp image is formed on the screen, causing glare. When it exceeds 4 times, the degree of light spreading is large, so that the lamp is dimly visible and visibility of the screen may be poor, and sparkling may occur.

As described above, the first inorganic particle aggregate is in the form of secondary particles formed by aggregating a plurality of first inorganic particles in the form of primary particles. Specifically, 5 or more, 10 or more, 30 or more, or 30 to 50 of the first inorganic particles may be aggregated to form a first inorganic particle aggregate, and the first inorganic particles may be aggregated in a grape cluster shape, and the like. In addition, the first inorganic particles in the form of primary particles may have an average particle diameter of 50 nm or less, 5 to 45 nm, or 10 to 40 nm.

In addition, the second inorganic particle aggregate is in the form of secondary particles formed by aggregating a plurality of second inorganic particles in the form of primary particles. Specifically, 5 or more, 10 or more, 30 or more, or 30 to 50 of the second inorganic particles may be aggregated to form a second inorganic particle aggregate, and the second inorganic particles may be aggregated in a grape cluster shape, and the like. In addition, the second inorganic particles in the form of primary particles may have an average particle diameter of 50 nm or less, 5 to 45 nm, or 10 to 40 nm.

A weight ratio of the first inorganic particle aggregate to the second inorganic particle aggregate may be 1:0.1 to 5, 1:0.15 to 4, or 1:0.2 to 3. When the content of the second inorganic particle aggregate is too low compared to the first inorganic particle aggregate, the size of surface irregularities is small, resulting in a lamp image, which may cause glare. When the content of the second inorganic particle aggregate is too high compared to the first inorganic particle aggregate, the degree of light spreading is high, and the lamp may be dimly visible, resulting in poor visibility.

Specific types of the first inorganic particle aggregate and the second inorganic particle aggregate may be at least one selected from the group consisting of silicon oxide, titanium dioxide, indium oxide, tin oxide, zirconium oxide, zinc oxide, and polysilsesquioxane particles (specifically, silsesquioxane particles having a cage structure), but the present disclosure is not limited thereto.

The hard coating layer may contain organic particles in the form of primary particles having an average particle diameter of 1 to 10 μm. The organic particles in the form of primary particles may have a refractive index of 1.480 to 1.620, 1.490 to 1.610, or 1.500 to 1.600 at a wavelength of 500 to 600 nm. Since the hard coating layer contains the organic particles having a high refractive index as described above, it is possible to prevent sparkling defects and mura occurring inside the panel while exhibiting excellent anti-glare properties.

The organic particles in the form of primary particles may have an average particle diameter of 1 to 10 μm, 1.5 to 8 μm, or 2 to 6 μm. When the average particle diameter of the organic particles in the form of primary particles is too large, there may be a problem that sparkling defects become severe due to refraction of light by the particles. When it is too small, dispersibility of the particles may be deteriorated, resulting in a problem of appearance defects due to particle aggregation.

The organic particles in the form of primary particles can prevent sparkling defects, occurrence of rainbow, image formation of a lamp and light spreading while having excellent visibility by achieving the haze of the anti-glare film in a specific range using the difference in refractive index with the binder resin in the hard coating layer. Specifically, the difference in refractive index between the organic particles in the form of primary particles and the binder resin may be 0.05 to 0.1, 0.06 to 0.09 to 0.07 to 0.08. When the difference in refractive index between the organic particles and the binder resin is too small, a large amount of particles must be included in order to achieve an appropriate haze, and thus a problem of poor image clarity may occur. When it is too large, white turbidity may become severe. The refractive index may be measured at a wavelength of 500 to 600 nm.

A content of the organic particles in the form of primary particles may be 30 to 90 parts by weight, 40 to 85 parts by weight, or 40 to 80 parts by weight based on 100 parts by weight of a total weight of the first inorganic particle aggregate and the second inorganic particle aggregate. When the content of the organic particles is too small, it is difficult to achieve sufficient internal haze at an appropriate thickness, and when it is too large, the internal haze increases at an appropriate thickness, resulting in a problem in that blackness and a contrast ratio may be reduced.

Specific types of the organic particles in the form of primary particles may be anyone or a copolymer of two or more thereof selected from polystyrene, polymethyl methacrylate, polymethyl acrylate, polyacrylate, polyacrylate-co-styrene, polymethylacrylate-co-styrene, polymethyl methacrylate-co-styrene, polycarbonate, polyvinyl chloride, polybutylene terephthalate, polyethylene terephthalate, polyamide, polyimide, polysulfone, polyphenylene oxide, polyacetal, epoxy resin, phenol resin, silicone resin, melamine resin, benzoguamine, polydivinylbenzene, polydivinylbenzene-co-styrene, polydivinylbenzene-co-acrylate, polydiallylphthalate, and triallyl isocyanate, but the present disclosure is not limited thereto.

The first inorganic particle aggregate, the second inorganic particle aggregate, and the organic particles in the form of primary particles may have a particle shape such as a spherical shape, an elliptical shape, a rod shape, or an amorphous shape. In the case of the rod shape or the amorphous shape, the length of the largest dimension may satisfy the above particle diameter range, and the like.

In addition, the average particle diameter of the first inorganic particle aggregate, the second inorganic particle aggregate, and the organic particles in the form of primary particles may be measured by, for example, a dynamic light scattering method, a laser diffraction method, a centrifugal sedimentation method, a FFF (Field Flow Fractionation) method, a pore electric resistance method, or the like.

The anti-glare film may have a reflection intensity ratio (R) calculated by the following Equation 1 of 0.6 to 1%, 0.6 to 0.9%, or 0.62 to 0.8%.

$$\text{Reflection intensity ratio } (R) = (R1/R2) \times 100 \quad \text{[Equation 1]}$$

in Equation 1,

R1 is a reflection intensity value measured at 45° corresponding to a regular reflection of an incident angle after irradiating light at the incident angle of 45° to the hard coating layer, and R2 is a reflection intensity value measured at 45° corresponding to a regular reflection of an incident angle after irradiating light at the incident angle of 45° to the light-transmitting substrate.

The reflection intensity ratio of Equation 1 is calculated as a percentage of the reflection intensity value (R1) measured for the hard coating layer to the reflection intensity value (R2) measured for the light-transmitting substrate.

When visible light is irradiated at an angle of 45° from the normal of the surface to the hard coating layer or the light-transmitting substrate to be measured, some light is diffused at 45°, which corresponds to a regular reflection of the incident angle. The intensity of light measured at 45°, which is in the regular reflection direction of the incident angle, is defined as R1 reflection intensity and R2 reflection intensity, respectively, depending on the object to be measured. In addition, in order to suppress reflection of the back surface and to meet the conditions at the time of actual use, a non-transmitting substrate is affixed to the back surface of the object.

The non-transmitting substrate is a substrate that does not transmit light such as visible light and has a light transmittance of approximately 0%, and may be, for example, a black acrylic plate, a black cardboard, or a film coated with a black pressure-sensitive adhesive. The film to which the black pressure-sensitive adhesive is applied may be, for example, a polyethylene terephthalate film to which a black pressure-sensitive adhesive is applied.

More specifically, in order to measure the reflection intensity (R1), the non-transmitting substrate having no irregularities or warps may be affixed to one surface of the light-transmitting substrate so as to face the hard coating layer. Thereafter, light is irradiated at an angle of 45° from the normal of the surface to the hard coating layer, and the reflection intensity (R1) can be measured at 45° corresponding to the regular reflection of the incident angle.

Further, in order to measure the reflection intensity (R2), only a light-transmitting substrate on which a hard coating layer is not formed is prepared, and a non-transmitting substrate is affixed to one surface of the light-transmitting substrate. Thereafter, light is irradiated at an angle of 45° from the normal of the surface to one surface of the light-transmitting substrate on which the non-transmitting is not affixed, and the reflection intensity (R2) can be measured at 45° corresponding to the regular reflection of the incident angle. Thereafter, the measured reflection intensities of R1 and R2 are substituted into Equation 1 to calculate the reflection intensity ratio (R).

If the reflection intensity ratio (R) is less than 0.6%, a lamp image is not formed when the lamp is illuminated, but the degree of light spreading is large, so that the lamp may be dimly visible and visibility of the screen may not be good. If it exceeds 1.0%, a lamp image may be formed, causing glare.

The reflective intensity ratio (R) of the anti-glare film may be determined by the average particle diameter of each of the two types of inorganic particle aggregates having different average particle diameters and the organic particles in the form of primary particles contained in the hard coating layer, the difference in average particle diameter therebetween, a volume fraction of the inorganic/organic particles in the hard coating layer, the difference in refractive index between the organic particles and the binder resin contained in the hard coating layer, an average height of irregularities formed on the hard coating layer, a height deviation of the irregularities formed on the hard coating layer, and the like.

In addition, the reflection intensity (R1) may be 300 to 700. Further, the reflection intensity (R2) may be 50000 to 70000.

In addition, when the flat non-transmitting substrate having no irregularities or warps is affixed to one surface of the light-transmitting substrate to face the hard coating layer and light is irradiated at an angle of 45° from the normal of the surface to the hard coating layer, diffused light in which the incident light is reflected may be emitted at an angle other than 45° corresponding to the regular reflection of the incident angle.

Herein, an angle of the diffused light where 1/10 times the reflection intensity R1 is measured may be 30 to 35° and 55 to 60°. Specifically, the reflection intensity value measured in diffused light of 30 to 35° and 55 to 60° after irradiating light at an incidence angle of 45° to the hard coating layer may be 1/10 times the reflection intensity of R1. If 1/10 times the reflection intensity of R1 does not appear in the above-described angle range of the diffused light, the degree of light spreading is large, so that the lamp may be dimly visible when the lamp is illuminated, resulting in poor visibility of the screen, or a lamp image may be formed, causing glare.

In addition, an angle of the diffused light where 1/100 times the reflection intensity R1 is measured may be 20 to 25° and 65 to 70°. Specifically, the reflection intensity value measured in diffused light of 20 to 25° and 65 to 70° after irradiating light at an incidence angle of 45° to the hard coating layer may be 1/100 times the reflection intensity of R1. If 1/10 times the reflection intensity of R1 does not appear in the above-described angle range of the diffused light, the degree of light spreading is large, so that the lamp may be dimly visible when the lamp is illuminated, resulting in poor visibility of the screen, or a lamp image may be formed, causing glare.

In general, the higher the haze value, the greater the degree of diffusion of external light, so that the anti-glare effect is excellent. However, there is a problem in that a contrast ratio decreases due to distortion of images by surface scattering and a whitening phenomenon by internal scattering. On the other hand, the anti-glare film has a total haze of 20 to 40%, 23 to 35%, or 25 to 30%, an internal haze of 10 to 20%, 12 to 19%, or 13 to 18%, and an external haze of 10 to 30%, 12 to 25%, or 14 to 20%. Accordingly, it is possible to prevent sparkling defects, rainbow occurrence, image formation of the lamp and light spreading while exhibiting excellent visibility.

In addition, the anti-glare film may have a ratio of an external haze to an internal haze of 0.6 to 2.0, 0.8 to 1.9, or 1.0 to 1.8. The ratio of an external haze to an internal haze of the anti-glare film may be determined by the average particle diameter of each of the two types of inorganic particle aggregates having different average particle diameters and the organic particles in the form of primary particles contained in the hard coating layer, the difference in average particle diameter therebetween, a volume fraction of the inorganic/organic particles in the hard coating layer, the difference in refractive index between the organic particles and the binder resin contained in the hard coating layer, and the like.

If the ratio of an external haze to an internal haze is less than 0.6, the anti-glare effect is lowered due to insufficient anti-glare visibility, and when the anti-glare film is located under a cover glass, an ANR (Anti-Newton) effect due to external irregularities formed on the hard coating layer is lowered, causing interference fringes, which may deteriorate optical properties. If the ratio exceeds 2.0, the external haze increases, so that sparkling due to external irregularities may become severe and image clarity may be reduced.

The anti-glare film may have a ratio of an external haze to the reflection intensity ratio (R) of 15 to 30, 20 to 29, or 21 to 28. The ratio of an external haze to the reflection intensity ratio (R) may be determined by the average particle diameter of each of the two types of inorganic particle aggregates having different average particle diameters and the organic particles in the form of primary particles contained in the hard coating layer, the difference in average particle diameter therebetween, a volume fraction of the inorganic/organic particles in the hard coating layer, the difference in refractive index between the organic particles and the binder resin contained in the hard coating layer, and the like.

If the ratio of an external haze to the reflection intensity ratio (R) is less than 15, the anti-glare effect is lowered due to severe light reflection, and when the anti-glare film is located under a cover glass, an ANR (Anti-Newton) effect due to external irregularities formed on the hard coating layer is lowered, causing interference fringes, which may deteriorate optical properties. If the ratio exceeds 30, light spreading by external light becomes severe, resulting in poor visibility of the screen. Further, sparkling due to external irregularities becomes severe, and image clarity may be reduced.

The binder resin of the hard coating layer included in the anti-glare film may include a (co)polymer of a vinyl-based monomer or a (meth)acrylate-based monomer.

The vinyl-based monomer or the (meth)acrylate-based monomer may include a monomer or an oligomer containing one or more, two or more, or three or more of a (meth) acrylate or vinyl group.

Specific examples of the monomer or oligomer containing (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylol propane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, and a mixture of two or more thereof; and a urethane modified acrylate oligomer, an epoxide acrylate oligomer, an ether acrylate oligomer, a dendritic acrylate oligomer, and a mixture of two or more thereof. Herein, the weight average molecular weight of the oligomer may be 1,000 to 10,000.

Specific examples of the monomer or oligomer containing a vinyl group may include divinylbenzene, styrene, and paramethylstyrene.

In addition, the polymer or copolymer included in the binder resin may further include a portion derived from at least one monomer selected from a reactive acrylate oligomer group consisting of an urethane acrylate oligomer, an epoxy acrylate oligomer, polyester acrylate, and polyether acrylate; a polyfunctional acrylate monomer group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycerol triacrylate, tripropylene glycol diacrylate, and ethylene glycol diacrylate.

The hard coating layer may include 2 to 10 parts by weight, 3 to 8 parts by weight, or 4 to 7 parts by weight of the organic particles in the form of primary particles based on 100 parts by weight of the binder resin. If less than 2 parts by weight of the organic particles are included based on 100 parts by weight of the binder resin, the haze by internal scattering may not be sufficiently realized, and if more than 10 parts by weight are included, the haze by internal scattering may become too high, resulting in a decrease in the contrast ratio.

A thickness of the hard coating layer may be 1 to 10 μm or 2 to 8 μm. If the thickness of the hard coating layer is less than 1 μm, it is difficult to obtain the desired hardness, and if it exceeds 10 μm, the hard coating layer may be curled in the process of curing the resin when forming the hard coating layer.

The thickness of the hard coating layer can be obtained by observing a cross section of the anti-glare film using a scanning electron microscope (SEM) and measuring the thickness of binder portion of the hard coating layer. On the other hand, since the thickness obtained by a method of subtracting an arithmetic mean roughness Ra of the hard coating layer from the thickness of the whole hard coating layer containing inorganic particles which has been measured by using a thickness measuring instrument (manufactured by TESA Co., Ltd.) almost coincides with the thickness of binder portion which has been measured by the SEM observation, such a method may be used.

As the light-transmitting substrate, a plastic film having transparency may be used. For example, triacetyl cellulose (TAC), polyester (TPEE), polyethylene terephthalate (PET), polyimide (PI), polyamide (PA), aramid, polyethylene (PE), polyacrylate (PAR), polyether sulfone, polysulfone, diacetyl cellulose, polypropylene (PP), polyvinyl chloride, acrylic resin (PMMA), polycarbonate (PC), epoxy resin, urea resin, urethane resin, melamine resin, and the like may be used. In particular, conventional anti-glare films often use triacetyl cellulose as a substrate, but the triacetyl cellulose film is susceptible to moisture and thus has a disadvantage of poor durability when used for outdoor displays. Therefore, a polyethylene terephthalate film having excellent moisture permeability is used as the substrate, but there is a problem in that rainbow defects caused by birefringence of polyethylene terephthalate must be solved.

However, the light-transmitting substrate included in the anti-glare film according to the embodiment may have in-plane retardation (Re) of 500 mm or less, or 5000 nm or more, measured at a wavelength of 400 nm to 800 nm. Specifically, the light-transmitting substrate may have in-plane retardation (Re) of 500 mm or less, 450 nm or less, or 10 to 400 nm, or 5000 nm or more, 5100 nm or more, or 5200 to 8000 nm, measured at a wavelength of 400 nm to 800 nm. More specifically, the light-transmitting substrate may be a polyethylene terephthalate film satisfying the above-described in-plane retardation. Using this film as a light-transmitting substrate may prevent a rainbow phenomenon caused by interference of visible light.

The in-plane retardation (Re) may be defined by the following equation, wherein d is a thickness of the light-transmitting substrate, $n_x$ is a refractive index in an in-plane slow axis direction, and $n_y$ is a refractive index in an in-plane fast axis direction.

$$Re=(n_x-n_y)*d$$

In addition, the retardation value is an absolute value and may be defined as a positive number.

The thickness of the light-transmitting substrate may be 10 to 300 µm, 30 to 250 µm, or 40 to 200 µm in consideration of productivity, but is not limited thereto.

According to another embodiment of the present disclosure, there is provided a composition for forming a hard coating layer of an anti-glare film including a binder resin and particles dispersed in the binder resin, wherein the particles include a first inorganic particle aggregate having an average particle diameter of 1 to 2 µm; a second inorganic particle aggregate having an average particle diameter of 3 to 5 µm; and organic particles in the form of primary particles having an average particle diameter of 1 to 10 µm.

The binder resin and particles included in the composition for forming a hard coating layer are as described in the anti-glare film.

The composition for forming a hard coating layer may be coated on the light-transmitting substrate, dried, and cured to form the hard coating layer of the anti-glare film.

In addition, the first inorganic particle aggregate, the second inorganic particle aggregate and the organic particles in the form of primary particles included in the composition for forming a hard coating layer are not aggregated additionally during drying or curing, so that the first inorganic particle aggregate, the second inorganic particle aggregate, and the organic particles in the form of primary particles themselves may exist in the final hard coating layer.

In addition, the composition for forming a hard coating layer may further include a photoinitiator. Accordingly, the photopolymerization initiator may remain in the hard coating layer prepared from the composition for forming a hard coating layer described above.

As the photopolymerization initiator, any compound known to be used in the composition for forming a hard coating layer may be used without limitation, and specifically, a benzophenone-based compound, an acetophenone-based compound, a biimidazole-based compound, a triazine-based compound, an oxime-based compound, or a mixture of two or more thereof may be used.

The photopolymerization initiator may be used in an amount of 1 to 10 parts by weight, 2 to 9 parts by weight, or 3 to 8 parts by weight based on 100 parts by weight of the binder resin. If the amount of the photopolymerization initiator is too small, an uncured material may be generated in the photocuring step of the composition for forming a hard coating layer. If the amount of the photopolymerization initiator is too large, the unreacted initiator may remain as an impurity or the cross-linking density may be lowered, thereby deteriorating mechanical properties of the film to be prepared.

In addition, the composition for forming a hard coating layer may further include an organic solvent. Non-limiting examples of the organic solvent include ketones, alcohols, acetates, ethers, benzene derivatives, and a mixture of two or more thereof.

Specific examples of the organic solvent include ketones such as methyl ethyl ketone, methyl isobutyl ketone, acetylacetone, or isobutyl ketone; alcohols such as methanol, ethanol, n-propanol, i-propanol, n-butanol, i-butanol, or t-butanol; acetates such as ethyl acetate, i-propyl acetate, or polyethylene glycol monomethyl ether acetate; ethers such as tetrahydrofuran or propylene glycol monomethyl ether; and a mixture of two or more thereof.

The organic solvent may be included in the composition for forming a hard coating layer by adding the organic solvent at the time of mixing the respective components contained in the composition for forming a hard coating layer, or by adding the organic solvent in a state that the respective components are dispersed in or mixed with the organic solvent. If the amount of the organic solvent in the composition for forming a hard coating layer is too small, flowability of the composition for forming a hard coating layer is lowered and thus defects such as streaks may occur in the final film. In addition, when an excessive amount of the organic solvent is added, the solid content is lowered, so that coating and film formation may not be sufficiently performed. Accordingly, physical properties or surface properties of the film may be deteriorated, and defects may occur during drying and curing. Therefore, the composition for forming a hard coating layer may include the organic solvent such that a total solid concentration of the components contained therein is 1 wt % to 50 wt %, or 2 to 20 wt %.

A method and device commonly used for coating the composition for forming a hard coating layer may be used without particular limitation, and for example, a bar coating method such as a Meyer bar method, a gravure coating method, a 2-roll reverse coating method, a vacuum slot die coating method, a 2 roll coating method, or the like may be used.

In the step of photocuring the composition for forming a hard coating layer, ultraviolet light or visible light having a wavelength of 200 to 400 nm may be irradiated, and an exposure amount during irradiation is preferably 50 to 4,000 mJ/cm$^2$. The exposure time is also not particularly limited, and may be appropriately changed depending on the exposure device used, the wavelength of the irradiation light, or the exposure amount. Further, in the step of photocuring the composition for forming a hard coating layer, nitrogen purging may be performed to apply nitrogen atmosphere conditions.

According to another embodiment of the present disclosure, there may be provided a polarizing plate including the anti-glare film. The polarizing plate may include a polarizing film and an anti-glare film formed on at least one surface of the polarizing film.

The material and preparation method of the polarizing film are not particularly limited, and conventional materials and preparation methods known in the art may be used. For example, the polarizing film may be a polyvinyl alcohol-based polarizing film.

A protective film may be provided between the polarizing film and the anti-glare film. The protective film may be at least one selected from a cycloolefin polymer (COP)-based film, an acrylic film, a triacetylcellulose (TAC)-based film, a cycloolefin copolymer (COC)-based film, a polynorbornene (PNB)-based film, and a polyethylene terephtalate (PET)-based film, and the present disclosure is not limited thereto.

The protective film may use a substrate for forming a single coating layer in the preparation of the anti-glare film. The polarizing film and the anti-glare film may be laminated by an adhesive such as an aqueous adhesive or a non-aqueous adhesive.

According to another embodiment of the present disclosure, there may be provided a display apparatus including the anti-glare film.

Specific examples of the display apparatus may include an apparatus such as liquid crystal display, plasma display, or organic light emitting diodes, but the present disclosure is not limited thereto.

For example, the display apparatus may be a liquid crystal display including a pair of polarizing plates facing each other; a thin-film transistor, a color filter, and a liquid crystal cell sequentially stacked between the pair of polarizing plates; and a backlight unit. In the display apparatus including an anti-glare film, the anti-glare film may be positioned on one surface of the polarizing plate that is relatively far from the backlight unit among the pair of polarizing plates.

In the display apparatus, the anti-glare film may be provided on the outermost surface of the display panel on the viewer side or on the backlight side. More specifically, the display apparatus may be an apparatus for notebook display, TV display, or large-area advertising display, and the anti-glare film may be located on the outermost surface of the apparatus for notebook display, TV display, or large-area advertising display.

Advantageous Effects

According to the present disclosure, there are provided an excellent anti-glare film capable of preventing sparkling defects, occurrence of rainbow, image formation of a lamp and light spreading while having excellent anti-glare properties as well as excellent physical properties such as scratch resistance and stain resistance, a polarizing plate and a display apparatus including the same.

The present invention will be described in more detail in the following examples. However, these examples are only to illustrate the invention, and the scope of the invention is not limited thereto.

EXAMPLES AND COMPARATIVE EXAMPLES

Preparation of Anti-Glare Film (1) Preparation of Composition for Forming Hard Coating Layer (1-1) Preparation Example 1

50 parts by weight of EB-1290 (photocurable aliphatic urethane hexaacrylate, manufactured by SK Entis, weight average molecular weight of 1000) and 50 parts by weight of trimethylolpropane triacrylate were prepared as a binder resin. 5 parts by weight of IRG184 (Irgacure 184, hydroxycyclohexylphenyl ketone, manufactured by Ciba Specialty Chemicals, Switzerland) as an initiator, 50 parts by weight of toluene as a solvent, 50 parts by weight of methyl ethyl ketone as a solvent, 5.5 parts by weight of SS-50F (surface-treated hydrophobic silica, average particle diameter of 1 to 2 μm, manufactured by Tosoh Silica Co., Ltd.) as a first inorganic particle aggregate, 2.3 parts by weight of Acematt 3600 (silica aggregate, average particle diameter of 3 to 4 μm, manufactured by Evonik Tego) as a second inorganic particle aggregate, and 4.0 parts by weight of PS spherical particles a (polystyrene spherical particles, average particle diameter of 2 μm, refractive index of 1.595) as organic particles in the form of primary particles were prepared based on 100 parts by weight of the binder resin, and mixed to prepare a composition for forming a hard coating layer of Preparation Example 1.

In addition, the average particle diameter of each of the inorganic particle aggregates and organic particles can be confirmed by a commonly known method. For example, it may be calculated and derived by measuring a radius of each particle confirmed in an electron micrograph (SEM, TEM, etc.), or may be calculated by an X-ray scattering experiment.

(1-2) Preparation Example 2

50 parts by weight of EB-1290 (photocurable aliphatic urethane hexaacrylate, manufactured by SK Entis, weight average molecular weight of 1000) and 50 parts by weight of pentaerythritol triacrylate (manufactured by SK Entis) were prepared as a binder resin. 5 parts by weight of IRG184 (Irgacure 184, hydroxycyclohexylphenyl ketone, manufactured by Ciba Specialty Chemicals, Switzerland) as an initiator, 50 parts by weight of toluene as a solvent, 50 parts by weight of methyl ethyl ketone as a solvent, 7.5 parts by weight of SS-50 (surface-treated hydrophobic silica aggregate, average particle diameter of 1 to 2 μm, manufactured by Tosoh Silica Co., Ltd.) as a first inorganic particle aggregate, 1.5 parts by weight of Acematt 3600 as a second inorganic particle aggregate, and 5.3 parts by weight of PS spherical particles b (polystyrene spherical particles, average particle diameter of 1.3 μm, refractive index of 1.595) as organic particles in the form of primary particles were prepared based on 100 parts by weight of the binder resin, and mixed to prepare a composition for forming a hard coating layer of Preparation Example 2.

(1-3) Preparation Example 3

A composition for forming a hard coating layer of Preparation Example 3 was prepared in the same manner as in Preparation Example 1, except that 7.5 parts by weight of PS-PMMA spherical particles a (polystyrene-polymethyl methacrylate copolymerized spherical particles, average particle diameter of 5 μm, refractive index of 1.555) and 5.8 parts by weight of PS-PMMA spherical particles (polystyrene-polymethyl methacrylate copolymerized spherical particles, average particle diameter of 3.5 μm, refractive index of 1.515) were used instead of 5.5 parts by weight of SS-50F as the first inorganic particle aggregate, 2.3 parts by weight of Acematt 3600 as the second inorganic particle aggregate, and 4.0 parts by weight of PS spherical particles a as the organic particles in the form of primary particles.

(1-4) Preparation Example 4

A composition for forming a hard coating layer of Preparation Example 4 was prepared in the same manner as in Preparation Example 1, except that 9.5 parts by weight of SS-50 as the first inorganic particle aggregate and 5.0 parts by weight of PS spherical particles a as the organic particles in the form of primary particles were used instead of 5.5 parts by weight of SS-50F as the first inorganic particle aggregate, 2.3 parts by weight of Acematt 3600 as the second inorganic particle aggregate, and 4.0 parts by weight of PS spherical particles a as the organic particles in the form of primary particles.

(1-5) Preparation Example 5

50 parts by weight of pentaerythritol triacrylate (manufactured by SK Entis) and 50 parts by weight of trimethylolpropane triacrylate were prepared as a binder resin. 5 parts by weight of IRG184 (Irgacure 184, hydroxycyclohexylphenyl ketone, manufactured by Ciba Specialty Chemicals, Switzerland) as an initiator, 50 parts by weight of toluene as a solvent, 50 parts by weight of methyl ethyl ketone as a solvent, 10 parts by weight of Acematt 3600 as a second inorganic particle aggregate, and 4.5 parts by weight of PS spherical particles a as organic particles in the form of primary particles were prepared based on 100 parts by weight of the binder resin, and mixed to prepare a composition for forming a hard coating layer of Preparation Example 5.

(1-6) Preparation Example 6

A composition for forming a hard coating layer of Preparation Example 6 was prepared in the same manner as in Preparation Example 5, except that 4.5 parts by weight of T145A (POSS(Silsesquioxane), average particle diameter of 5 refractive index of 1.42, manufactured by Toshiba) as the inorganic particles in the form of primary particles and 7 parts by weight of PS-PMMA spherical particles b were used instead of 10 parts by weight of Acematt 3600 as the second inorganic particle aggregate, and PS spherical particles a as the organic particles in the form of primary particles.

(1-7) Preparation Example 7

A composition for forming a hard coating layer of Preparation Example 7 was prepared in the same manner as in Preparation Example 1, except that 4.5 parts by weight of SS-50 (surface-treated hydrophobic silica aggregate, average particle diameter of 1 to 2 μm, manufactured by Tosoh Silica Co., Ltd.) was used instead of 2.3 parts by weight of Acematt 3600 as the second inorganic particle aggregate.

(2) Preparation of Anti-Glare Film

The composition for forming a hard coating layer prepared in one of Preparation Examples 1 to 7 was coated on triacetyl cellulose (TAC, thickness of 60 μm), which is a light-transmitting substrate, with #10 meyer bar as shown in Table 1 below, and dried at 90° C. for 1 minute. The dried material was irradiated with ultraviolet rays of 150 mJ/cm$^2$ to form a hard coating layer, and an anti-glare film was prepared. At this time, the thickness of the hard coating layer is shown in Table 1 below.

TABLE 1

| | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Composition for forming hard coating layer | Prep. Ex. 1 | Prep. Ex. 2 | Prep. Ex. 3 | Prep. Ex. 4 | Prep. Ex. 5 | Prep. Ex. 6 | Prep. Ex. 7 |
| Hard coating layer thickness (μm) | 5 | 5 | 4 | 4 | 6 | 7 | 5 |

Experimental Examples

1. Transmittance and Haze

A specimen of 4 cm×4 cm was prepared from the anti-glare film obtained in one of Examples and Comparative Examples, and the haze was measured three times using a haze meter (HM-150, light source A, manufactured by Murakami). Thereafter, an average value thereof was calculated as the total haze. Herein, the transmittance and the total haze were measured at the same time. Specifically, the transmittance was measured according to the JIS K 7361 standard, and the haze was measured according to the JIS K 7136 standard.

In the measurement of internal haze, an adhesive film having a total haze of 0 was attached to a coated surface of an optical film to be measured to make the uneven surface flat, and then the internal haze was measured in the same manner as the total haze above. The external haze was calculated as an average value of the difference between the total haze and the internal haze, and the transmittance, the internal haze, and the external haze are shown in Table 2 below.

2. Reflection Intensity Ratio

A specimen was prepared by attaching a flat polyethylene terephthalate film coated with a black pressure-sensitive adhesive without irregularities or warps on one surface of a light-transmitting substrate so as to face a hard coating layer of the anti-glare film obtained in one of Examples and Comparative Examples. Thereafter, the specimen was mounted on a goniometer (GC5000L, manufactured by Nippon Denshoku industries), and light is irradiated at an angle of 45° from the normal of the surface to the hard coating layer of the specimen. After the light was irradiated to the surface of the hard coating layer, the reflection intensity (R1) was measured at 45° corresponding to the regular reflection of the incident angle.

In addition, a light-transmitting substrate on which the hard coating layer is not formed from Examples and Comparative Examples. Thereafter, when light with a 4 mm lamp size was illuminated from a height of 20 cm, light spreading was evaluated by the size of the image appearing on the specimen. Specifically, the evaluation criteria for light spreading are as described below, and the results are shown in Table 2 below.

Good: No lamp image was observed, or the size of the lamp image was less than 5 cm.

Poor: The size of the lamp image exceeded 5 cm.

TABLE 2

|  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Transmittance (%) | 90.3 | 90.2 | 90.7 | 90.5 | 90.0 | 90.7 | 90.7 |
| Internal haze (%) | 10.5 | 12.2 | 12.0 | 10.0 | 11.0 | 13.0 | 10.5 |
| External haze (%) | 17.0 | 16.0 | 14.0 | 15.0 | 23.0 | 7.0 | 15.0 |
| External haze/Internal haze | 1.6 | 1.3 | 1.2 | 1.5 | 2.1 | 0.5 | 1.4 |
| Reflection intensity ratio (%) | 0.63 | 0.65 | 4.20 | 1.10 | 0.41 | 5.70 | 1.23 |
| External haze/Reflection intensity ratio | 27.0 | 24.6 | 3.3 | 13.6 | 56.1 | 1.2 | 12.2 |
| Diffusion angle range (°) where 1/10 times reflection intensity R1 measured | 34~35, 55~56 | 3~34, 56~57 | 0~41 50~51 | 6~37, 53~54 | 8~29, 61~62 | 3~44, 46~47 | 6~37, 53~54 |
| iffusion angle range (°) where 1/100 times reflection intensity R1 measured | 24~25, 66~67 | 4~25 66~67 | 4~35 54~55 | 6~27, 63~64 | 8~19, 71~72 | 7~38 52~53 | 6~27, 63~64 |
| isibility (formation of lamp image) | Good | Good | Poor | Poor | Good | Poor | Poor |
| Light spreading | Good | Good | Good | Good | Poor | Good | Poor | parative Examples, specifically, a light-transmitting substrate described in Table 1 above, was prepared. A specimen was prepared by attaching a flat polyethylene terephthalate film coated with a black pressure-sensitive adhesive without irregularities or warps on one surface of the light-transmitting substrate, and the reflection intensity (R2) was measured in the same manner as in the reflection intensity (R1).

The measured reflection intensities of R1 and R2 were substituted into the following Equation 1 to calculate the reflection intensity ratio (R), and the results are shown in Table 2 below.

Reflection intensity ratio $(R)=(R1/R2)\times100$ [Equation 1]

In addition, a range of diffused light where 1/10 times the reflection intensity R1 and 1/100 times the reflection intensity R1 are measured was confirmed, and the results are shown in Table 2 below.

3. Visibility (Formation of Lamp Image)

A specimen was prepared by attaching a flat polyethylene terephthalate film coated with a black pressure-sensitive adhesive without irregularities or warps on one surface of a light-transmitting substrate so as to face a hard coating layer of the anti-glare film obtained in one of Examples and Comparative Examples. Thereafter, the visibility was measured by irradiating light using a fluorescent lamp having two rows of lamps as a light source, and then observing a reflected image of the fluorescent lamp in a regular reflection direction of each anti-glare film. The evaluation criteria for visibility are as described below, and the results are shown in Table 2 below.

Good: No lamp image was observed.

Poor: The lamp image was clearly visible.

4. Light Spreading

A specimen was prepared by attaching a flat polyethylene terephthalate film coated with a black pressure-sensitive adhesive without irregularities or warps on one surface of a light-transmitting substrate so as to face a hard coating layer of the anti-glare film obtained in one of Examples and Referring to Table 2, it was confirmed that the anti-glare films of Examples 1 and 2 had the reflection intensity ratio of 0.6 to 1%, the ratio of the external haze to the reflection intensity ratio of 15 to 30, and the ratio of the internal haze to the external haze of 0.6 to 2, and no lamp image was formed and light spreading didn't occur.

On the other hand, it was confirmed in Comparative Example 1 in which inorganic particles were not used and the above numerical range was not satisfied; Comparative Examples 2 and 5 in which the second inorganic particle aggregate was not used and the above numerical range was not satisfied; Comparative Example 3 in which the first inorganic particle aggregate was not used and the above numerical range was not satisfied; and Comparative Example 4 in which the inorganic particle aggregate was not used and the above particle range was not satisfied that the lamp image was formed or light spreading occurred.

What is claimed is:

1. An anti-glare film, comprising a light-transmitting substrate; and a hard coating layer containing a binder resin and particles dispersed in the binder resin,
   wherein the particles comprise a first inorganic particle aggregate having an average particle diameter of 1 to 2 μm; a second inorganic particle aggregate having an average particle diameter of 3 to 5 μm; and organic particles in the form of primary particles having an average particle diameter of 1 to 10 μm.

2. The anti-glare film of claim 1,
   wherein a reflection intensity ratio (R) calculated by the following Equation 1 is 0.6 to 1%:

Reflection intensity ratio $(R)=(R1/R2)\times100$ [Equation 1]

in Equation 1,
   R1 is a reflection intensity value measured at 45° corresponding to a regular reflection of an incident angle after irradiating light at the incident angle of 45° to the hard coating layer, and R2 is a reflection intensity value measured at 45° corresponding to a regular reflection of an incident angle after irradiating light at the incident angle of 45° to the light-transmitting substrate.

3. The anti-glare film of claim 2,
wherein a reflection intensity value measured in diffused light of 30 to 35° and 55 to 60° after irradiating light at an incidence angle of 45° to the hard coating layer is 1/10 times the reflection intensity value of R1.

4. The anti-glare film of claim 2,
wherein a reflection intensity value measured in diffused light of 20 to 25° and 65 to 70° after irradiating light at an incidence angle of 45° to the hard coating layer is 1/100 times the reflection intensity value of R1.

5. The anti-glare film of claim 1,
wherein the first inorganic particle aggregate is in the form of secondary particles in which five or more first inorganic particles in the form of primary particles are aggregated, and
the first inorganic particles in the form of primary particles have an average particle diameter of 50 nm or less.

6. The anti-glare film of claim 1,
wherein the second inorganic particle aggregate is in the form of secondary particles in which five or more second inorganic particles in the form of primary particles are aggregated, and
the second inorganic particles in the form of primary particles have an average particle diameter of 50 nm or less.

7. The anti-glare film of claim 1, wherein an absolute value of a difference in refractive index between the organic particles in the form of primary particles having an average particle diameter of 1 to 10 μm and the binder resin is 0.05 to 0.1.

8. The anti-glare film of claim 1,
wherein an average particle diameter ratio of the second inorganic particle aggregate to the first inorganic particle aggregate is 1.5 to 4 times.

9. The anti-glare film of claim 1,
wherein a weight ratio of the first inorganic particle aggregate to the second inorganic particle aggregate is 1:0.1 to 5.

10. The anti-glare film of claim 1,
wherein a content of the organic particles in the form of primary particles is 30 to 90 parts by weight based on 100 parts by weight of a total weight of the first inorganic particle aggregate and the second inorganic particle aggregate.

11. The anti-glare film of claim 2,
wherein the anti-glare film has a ratio of an external haze to the reflection intensity ratio (R) of 15 to 30.

12. The anti-glare film of claim 1,
wherein the anti-glare film has a ratio of an external haze to an internal haze of 0.6 to 2.

13. The anti-glare film of claim 1,
wherein the binder resin comprises a (co)polymer of a vinyl-based monomer or a (meth)acrylate-based monomer.

14. The anti-glare film of claim 1,
wherein the hard coating layer comprises 2 to 10 parts by weight of the organic particles in the form of primary particles based on 100 parts by weight of the binder resin.

15. The anti-glare film of claim 1,
wherein the light-transmitting substrate has in-plane retardation (Re) measured at a wavelength of 400 nm to 800 nm of 500 mm or less, or 5000 nm or more.

16. A composition for forming a hard coating layer of an anti-glare film comprising a binder resin and particles dispersed in the binder resin,
wherein the particles comprise a first inorganic particle aggregate having an average particle diameter of 1 to 2 μm; a second inorganic particle aggregate having an average particle diameter of 3 to 5 μm; and organic particles in the form of primary particles having an average particle diameter of 1 to 10 μm.

17. A polarizing plate comprising the anti-glare film of claim 1.

18. A display apparatus comprising the anti-glare film of claim 1.

19. The anti-glare film of claim 1,
wherein the first inorganic particle aggregate and the second inorganic particle aggregate is at least one selected from the group consisting of silicon oxide, titanium dioxide, indium oxide, tin oxide, zirconium oxide, zinc oxide, and polysilsesquioxane particles.

20. The anti-glare film of claim 1,
wherein the organic particles in the form of primary particles is anyone or a copolymer of two or more selected from the group of polystyrene, polymethyl methacrylate, polymethyl acrylate, polyacrylate, polyacrylate-co-styrene, polymethylacrylate-co-styrene, polymethyl methacrylate-co-styrene, polycarbonate, polyvinyl chloride, polybutylene terephthalate, polyethylene terephthalate, polyamide, polyimide, polysulfone, polyphenylene oxide, polyacetal, epoxy resin, phenol resin, silicone resin, melamine resin, benzoguamine, polydivinylbenzene, polydivinylbenzene-co-styrene, polydivinylbenzene-co-acrylate, polydiallylphthalate, and triallyl isocyanate.

* * * * *